UNITED STATES PATENT OFFICE.

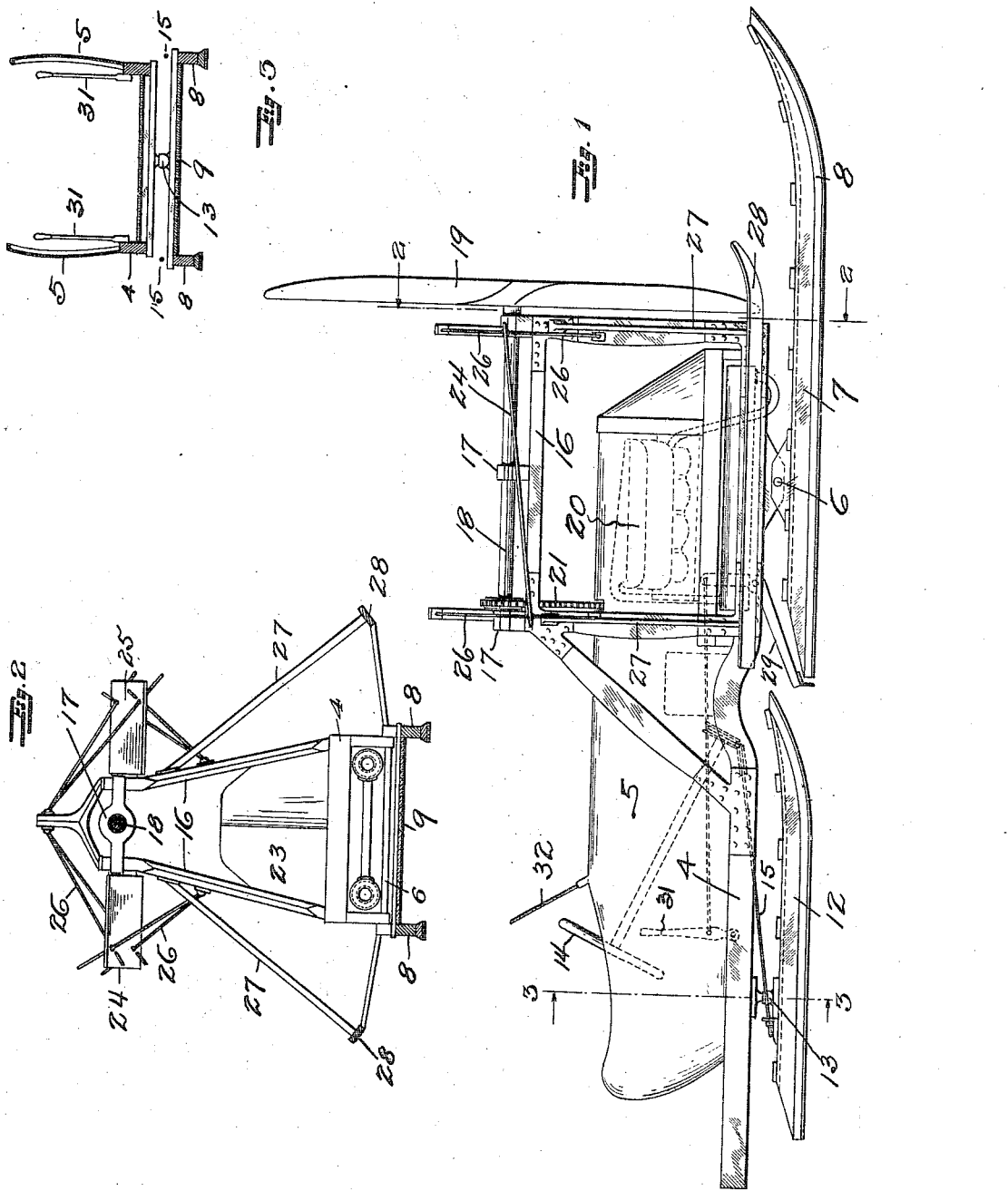

COREY C. BRAYTON, OF BERKELEY, CALIFORNIA, AND ALEXANDER A. ALLAN, OF NOME, TERRITORY OF ALASKA.

POWER-DRIVEN SLED.

1,305,644.  Specification of Letters Patent.  Patented June 3, 1919.

Application filed July 12, 1916. Serial No. 108,849.

*To all whom it may concern:*

Be it known that we, COREY C. BRAYTON and ALEXANDER A. ALLAN, citizens of the United States, and residents of Berkeley, county of Alameda, and State of California, and Nome, Territory of Alaska, respectively, have invented a certain new and useful Power-Driven Sled, of which the following is a specification.

The invention relates to sleds and particularly to tractor sleds which are propelled by a propeller operating in the air.

An object of the invention is to provide a power driven sled which is efficiently operative on both ice and snow.

Another object of the invention is to provide a power driven tractor sled for hauling other loaded sleds.

A further object of the invention is to provide means for overcoming the overturning reaction due to the rotation of the propeller and engine.

The invention possesses other advantageous features, which, with the foregoing will be set forth at length in the following description where we shall outline in full that form of the invention which we have selected for illustration in the drawings accompanying and forming part of the present specification. In the drawings we have shown one specific form of the sled of our invention, but it is to be understood that we do not limit ourselves to such form, since the invention may be embodied in a plurality of forms, each comprising a species of the invention as set forth in the appended claims.

Referring to said drawings:

Figure 1 is a side view of the sled of our invention.

Fig. 2 is a cross section taken on the line 2—2, Fig. 1.

Fig. 3 is a cross section taken on the line 3—3, Fig. 1.

The sled of our invention comprises a frame 4 of suitable construction upon which the body 5 is mounted. Pivotally attached to the lower side of the frame adjacent its forward end by means of the rod or axle 6, is a bob 7, the pivotal connection being such that the bob is capable of partial rotation in a vertical arc only. The point of connection between the frame and the bob is preferably located adjacent the rear end of the bob and the runners 8 are curved upwardly at the forward end in the usual manner. The bob is formed as a toboggan provided with a deck 9 which also curves upward at the forward end, the deck serving to support the bob on snow through which the runners sink.

A rear bob 12 of similar construction is connected to the rear end of the frame by a universal joint 13, which permits it to move in any required direction with respect to the frame. The area of the decks of the two bobs is sufficient to support the sled and its load on soft snow. The sled is steered by turning the rear bob to the right or left, by means of the steering wheel 14 which is connected to the bob by a rope or chain 15, the ends of which are attached to opposite sides of the bob, preferably adjacent to the universal joint. The universal joint is placed well toward the back of the rear bob, so that the load is placed back of the center of the sled, thereby improving its riding. This arrangement produces a three point support for the body, relieving the body from any twisting strains due to uneven terrain.

Secured to the sled frame and extending above it at the front part of the sled, is the propeller shaft supporting frame 16, which is provided with suitable bearings 17 for the propeller shaft 18. The propeller or air screw 19 is suitably attached to the forward end of the propeller shaft. The propeller shaft is driven by the engine 20 arranged within the body and driving the propeller shaft through a suitable drive gear or chain 21. The engine is preferably of the water cooled type although an air cooled engine may be employed. When a water cooled engine is used, we prefer to use a radiator comprising a plurality of double walled tubes 22 arranged longitudinally of the frame below the engine. The annular spaces between the walls of the tubes through which the water flows are closed and interconnected, so that the water flows through all of the tubes and the water spaces are connected to the water jacket of the engine; circulation being produced by a pump or otherwise. The passages within the inner walls of the tubes are open, to permit the ready flow of air or air and snow therethrough and this air or air and snow is discharged below the engine and body so that it will not interfere with the engine.

The rotation of the propeller and engine produces a reaction in the opposite direction to their rotation, tending to overturn the sled and in order to overcome the effect of this reaction, inclined planes 24 and 25 are arranged on opposite sides of the frame 16 behind the propeller. These planes are suitably braced by tie rods 26 secured to the frame 16 and are inclined in opposite directions, so that the reaction of the air causes them to produce a turning movement in the opposite direction of the reaction produced by the propeller or engine. The planes are adjustable angularly so that the reaction effect thereof may be varied under different conditions. When traveling through a strong side wind which tends to overturn the sled, the planes are set to overcome also this overturning effect and the same is true when traveling on a side hill path.

Means are also provided for preventing the complete overturning of the sled and for preventing the propeller from striking the ice or snow over which the sled is traveling. Arranged at each side of the sled at the front end of the frame and supported by suitable braces 27 attached to the frames of the sled, are supplemental runners 28 which are raised above and spaced apart outwardly from the sled runners and so disposed that they come into contact with the snow or ice should the sled tend to turn over. The supplemental runners are spaced from the propeller shaft a greater distance than the length of a propeller blade, so that should the sled partially overturn, the runners will prevent contact of the tips of the blades with the snow or ice. Means are also provided for arresting the movement of the sled. Pivoted to the frame, at opposite sides thereof and adjacent the rear of the front bob are brake levers 29, each lever being connected to a hand lever 31 arranged adjacent the driver's seat. By operating one brake at a time it may be caused to assist in steering the sled. The body incloses the driver's seat and a shield 32 is provided to prevent the cold air from striking the driver and if desirable, the driving compartment may be inclosed.

We claim:

1. In a sled, an air propeller, means for rotating said propeller and means for producing a turning moment in the opposite direction to the engine reaction.

2. In a sled, an air propeller, means for rotating said propeller and stationary inclined planes arranged behind and adjacent the propeller arranged to produce a turning moment on the sled in the opposite direction to the propeller reaction.

3. A sled comprising a frame, a supplemental frame arranged on said frame, a propeller shaft mounted on said supplemental frame, a propeller secured to said shaft, oppositely sloping inclined planes arranged at opposite sides of said shaft and behind the propeller and means for rotating said shaft.

4. A sled comprising a frame, runners attached to said frame, a power driven air propeller for propelling the sled and outrigger runners attached to the frame and being normally disposed above the sled runners and being spaced from the center of the propeller a greater distance than the length of a propeller blade.

5. A sled comprising a frame, a bob pivoted on a transverse axis arranged adjacent one end of the sled, a second bob arranged adjacent the other end of the frame and secured thereto by a universal joint, and outrigger runners attached to said frame and being normally disposed above the plane of the bob runners.

6. In a sled, a frame, runners attached to said frame, a power driven air propeller for propelling the sled, means for counterbalancing the overturning reaction of the propeller and means for preventing the sled from overturning.

7. In a sled, an air propeller, means for rotating said propeller and inclined planes on the sled arranged to produce a turning movement on the sled in the opposite direction to the propeller reaction.

In testimony whereof, we have hereunto set our hands at San Francisco, California, this 7th day of July 1916.

COREY C. BRAYTON.
ALEXANDER A. ALLAN.

In presence of—
H. G. PROST.

Copies of this patent may be obtained for five cents each, by addressing the "Commissioner of Patents, Washington, D. C."